(12) United States Patent
Rich

(10) Patent No.: US 6,365,133 B1
(45) Date of Patent: Apr. 2, 2002

(54) DOG CHEW TOY CONTAINING EDIBLE PET TOOTHPASTE FOR DENTAL CARE

(76) Inventor: James E. Rich, 802 S. Bayfront, Balboa Island, CA (US) 92662

( * ) Notice: Subject to any disclaimer, the term of this patent is extended or adjusted under 35 U.S.C. 154(b) by 0 days.

(21) Appl. No.: 09/631,250

(22) Filed: Aug. 2, 2000

(51) Int. Cl.⁷ .................................................. A61K 7/16
(52) U.S. Cl. .......................................... 424/49; 424/48
(58) Field of Search ............................ 424/49, 48, 401, 424/58, 57; 433/1; 426/805

(56) References Cited

U.S. PATENT DOCUMENTS

| | | | |
|---|---|---|---|
| 3,882,257 A | | 5/1975 | Cagle |
| 4,089,943 A | * | 5/1978 | Roberts et al. ............... 424/49 |
| 4,145,447 A | | 3/1979 | Fisher et al. |
| 4,254,101 A | | 3/1981 | Denny, Jr. |
| 5,011,679 A | | 4/1991 | Spanier et al. |
| 5,015,785 A | | 5/1991 | Steck et al. |
| 5,047,231 A | | 9/1991 | Spanier et al. |
| 5,094,870 A | | 3/1992 | Scaglione et al. |
| 5,100,651 A | | 3/1992 | Boyer |
| 5,114,704 A | | 5/1992 | Spanier et al. |
| 5,126,137 A | | 6/1992 | Lambert |
| 5,296,209 A | | 3/1994 | Simone et al. |
| 5,296,217 A | | 3/1994 | Stookey |
| 5,310,541 A | | 5/1994 | Montgomery |
| 5,336,494 A | * | 8/1994 | Pellico ...................... 424/94.4 |
| 5,407,661 A | | 4/1995 | Simone et al. |
| 5,431,927 A | | 7/1995 | Hand et al. |
| 5,467,741 A | | 11/1995 | O'Rourke |
| 5,599,126 A | * | 2/1997 | Hough ....................... 401/184 |
| 5,618,518 A | | 4/1997 | Stookey |
| 5,904,928 A | | 5/1999 | Cyr et al. |
| 5,908,614 A | | 6/1999 | Montgomery |
| 5,944,516 A | | 8/1999 | Deshaies |
| 5,989,604 A | | 11/1999 | Wolf et al. |

OTHER PUBLICATIONS

Bellows (The Practice of Veterinary Dentistry, 2nd Edition, 1999).*

* cited by examiner

Primary Examiner—Zohreh Fay
Assistant Examiner—Brian-Yong Kwon
(74) Attorney, Agent, or Firm—Stout, Uxa, Buyan & Mullins, LLP; Donald E. Stout

(57) ABSTRACT

A dog chew is coated with a dried anti-tartar toothpaste on its outer surface. Upon chewing, the dog's saliva rehydrates the toothpaste, and the chewing action causes abrasive cleaning to occur at the gingival surface of the teeth.

26 Claims, No Drawings

DOG CHEW TOY CONTAINING EDIBLE PET TOOTHPASTE FOR DENTAL CARE

BACKGROUND OF THE INVENTION

This invention relates generally to products for reducing tartar on the teeth of dogs, and more particularly to a dog chew product which is coated on its outer surface with a dried anti-tartar toothpaste.

Veterinarians have long recommended that dog owners brush the teeth of their dogs regularly in order to reduce tartar build-up, and hopefully prevent or delay the onset of periodontal disease and possible tooth loss. Unfortunately, because dogs do not tend to readily accept this type of activity, only a small percentage of persistent dog owners actually regularly brush their pets' teeth. There is, therefore, a need to make cleansing the teeth of dogs easier so that it is more regularly and frequently performed.

A number of products have been developed over a long period of time in an attempt to address this long-felt need. For example, U.S. Pat. No. 3,882,257 to Cagle describes a pet food product in which a slurry is dehydrated and made into a simulated bone for dogs which can help exercise the jaws and gums and help to remove tartar from the teeth. U.S. Pat. No. 4,145,447 to Fisher et al. discloses an animal food which is chew resistant and can help remove plaque or tartar from animal teeth. Still another product of this type is disclosed in U.S. Pat. No. 5,094,870 to Scaglione et al., which discloses a process for preparing dog biscuits containing at least one inorganic phosphate salt. The dog biscuits are (hopefully) chewed and/or eaten by the dog with the result that tartar accumulations on its teeth are reduced or prevented. U.S. Pat. Nos. 5,296,209 and 5,407,661, both to Simone et al., describe a pet chew product having a flexible cellular matrix in which is contained a cellulose fibrous material such as corn cob fractions having a mechanical cleansing function, which, when chewed by the pet, is intended to effect a reduction in plaque, stain, and tartar on the pet's teeth. While the foregoing approaches may be meritorious, they involve creating a unique food product, which is a relatively complex and expensive approach, and there is no guarantee that the resultant product will be accepted and actively consumed by dogs.

U.S. Pat. Nos. 5,011,679, 5,047,231, and 5,114,704, all to Spanier et al., disclose a method of preparing rawhide chew products which contain at least one inorganic pyrophosphate. The rawhide containing the at least one pyrophosphate is intended to be chewed and/or eaten by dogs with the result that future tartar accumulation on their teeth is hopefully reduced or prevented.

U.S. Pat. No. 5,100,651 to Boyer discloses a health product for the care of teeth of dogs, capable of being chewed or gnawed by the dogs, which contains fluoride, antimicrobial agents, and anti-decay agents.

U.S. Pat. No. 5,126,137 to Lambert discloses a small animal prophylactic dental aid having an open-celled foam body with gauze material.

U.S. Pat. No. 5,296,217 to Stookey discloses a method of preventing dental calculus using sequestering agents applied to commercially prepared diets of domestic animals. The sequestering agents form soluble calculus complexes in saliva and dental plaque, thereby preventing the calcificating dental plaques. Sodium hexametaphosphate has been utilized as a preferred sequestering agent.

U.S. Pat. No. 5,310,541 to Montgomery describes an animal chew product containing one or more enzymes and substrates for the purpose of generating antimicrobial compounds upon contact with animal saliva, for tartar prevention.

U.S. Pat. No. 5,431,927 to Hand et al. describes a pet food prepared from a fiber containing nutritionally balanced mixtures of carbohydrates, protein, fat, vitamins, and minerals. The product has an expanded striated structure matrix which fractures when chewed by a pet, creating a mechanical tooth cleansing function which acts to reduce plaque, stains and tartar on the pet's teeth.

U.S. Pat. No. 5,467,741 to O'Rourke discloses a chew toy for dogs which is molded from soft pliable threads twisted about one or more strands of twisted or synthetic fibers. The twisted fibers are impregnated with one or more breath freshening or flavoring agents so as to dispose the agent as the dog chews.

U.S. Pat. No. 5,618,518 to Stookey discloses a chew product containing sodium hexametaphosphate, which is useful against the buildup of dental calculus.

U.S. Pat. No. 5,904,614 to Cyr et al. discloses a food dog bone made of 93% casein, poultry meal, and gelatin, and 7% of an anti-tartar composition used in the control of tartar in domestic animals such as dogs.

U.S. Pat. No. 5,908,614 to Montgomery describes a peroxidase-activating oral care composition including an enzymatic water soluble hydrogen peroxide precursor ad pH adjusting agent. The composition facilitates the rapid release of hydrogen peroxide and results in the activation of a peroxidase enzyme in an oral cavity.

U.S. Pat. No. 5,944,516 to Deshaies discloses a device for cleaning the teeth of a dog, consisting of brushes, onto which toothpaste is automatically dispensed during a brushing procedure.

U.S. Pat. No. 5,989,604 to Wolf et al. discloses a pet foodstuff and treatment method for reducing the incidence of dental caries in non-human animals. Xylitol containing foodstuff is used.

Again, it is clear from the foregoing that many different types of products and approaches have been developed to address the problem of dental care for dogs, ranging from unique toothbrushes to unique pet food products, to chew products which contain tartar prevention coatings or additives. However, what is needed is a simple pet chew product which is known to have excellent pet acceptance, is inexpensive and simple to manufacture, and which addresses existing tartar accumulations on pet teeth, in a manner equivalent to manual tooth brushing techniques.

SUMMARY OF THE INVENTION

The present invention solves the foregoing problems by providing an edible toothpaste incorporate into a durable dog chew made from pieces of the dried ears of domestic animals. The animal ears, after being obtained from a slaughterhouse, are cleaned, dehaired, and used whole or cut or ground into suitably sized pieces. These suitable sizes vary, depending upon the size of dog being targeted. The ears or ear pieces are then oven-dried to remove moisture.

The dried ear and ear pieces consist primarily of a section of hard-firm ear cartilage with a piece of skin (rawhide) on each side.

The resultant dog chew, comprised of an ear which includes two pieces of rawhide and hard cartilage sandwiched therebetween provides prolonged chewing time over similarly available chews manufactured solely of rawhide, resulting in consequently increased abrasive effect on the teeth surfaces. This effect is enhanced by the addition of a coating of edible toothpaste, especially formulated for dogs, on the outer surface of the chew.

More particularly, there is provided a pet chew product comprising an inner layer of cartilage sandwiched between opposing outer layers of animal skin. The inner layer of cartilage preferably comprises a dried animal ear portion, and the outer layers of animal skin preferably comprise rawhide. Advantageously, a coating of edible toothpaste is disposed on a surface of the pet chew product. The coating of edible toothpaste comprises dental grade silica abrasives, which comprise at least about 10% by volume of the edible toothpaste coating, as applied.

In another aspect of the invention, there is provided a pet chew product comprising a chewable substance having toothpaste disposed on an outer surface thereof. Preferably, the chewable substance comprises rawhide, and toothpaste is coated onto the outer surface.

In still another aspect of the invention, there is provided a pet toothpaste formula, comprising dental grade silica abrasives, but excluding surfactants. This is an important innovation, because such surfactants, though harmless to humans, are dangerous for pets such as dogs, if swallowed. The pet toothpaste formula further comprises dicalcium phosphate, pumice, and one or more thickening and binding gents. In preferred formulations, the thickening and binding agents comprise one or more agents selected from a group including sorbitol, polyethylene glycol, carboxymethylcellulose, and glycerin.

In yet another aspect of the invention, there is described an inventive method of making a pet chew product which is effective in reducing tartar on a pet's teeth. The method comprises steps of providing a piece of chewable material having an outer surface, and applying a toothpaste formulation onto the outer surface. In preferred modes, the inventive method further comprises a step of heating the toothpaste formulation prior to performing the applying step. During the heating step, the toothpaste formulation is preferably heated to approximately 170 degrees F. The applying step is preferably performed by spraying the toothpaste formulation onto the outer surface.

The aforementioned providing step may include a step of grinding a plurality of pieces of the chewable material into sizes ranging from about ⅛ inches to ½ inches in diameter. The providing step also preferably includes a further drying step. More particularly, the providing step includes a step of providing a plurality of pieces of chewable material, and placing the plurality of pieces of chewable material into a rotating mixing drum. Then, the toothpaste formulation is sprayed onto the plurality of pieces of chewable material while they are tumbling in the drum.

In a further optional step, the piece of chewable material having the toothpaste formulation thereon is into a predetermined shape. This molding step includes a step of mixing the piece of chewable material having the toothpaste formulation thereon with additional material and a binder to form a pet chew mixture. The additional material preferably includes meat meal and/or bone meal. The mixing step preferably includes adding water to the pet chew mixture. Then, the pet chew mixture is heated, following which it is placed into molds. The molds are then placed into an oven to dry the heated mixture.

The invention, together with additional features and advantages thereof, may best be understood by reference to the following description.

DESCRIPTION OF THE PREFERRED EMBODIMENT

More particularly, the present invention comprises an edible toothpaste incorporated into a durable dog chew made from pieces of the dried ears of domestic animals.

The animal ears, after being obtained from a slaughterhouse, are cleaned, dehaired, and used whole or cut or ground into suitably sized pieces. These suitable sizes vary, depending upon the size of dog being targeted. The ears or ear pieces are then oven-dried to remove moisture.

The dried ear and ear pieces consist primarily of a section of hard-firm ear cartilage with a piece of skin (rawhide) on each side.

The edible toothpaste formula utilized in a preferred embodiment of the present invention preferably incorporates a high level of silica abrasive polishing material (10–30%) as disclosed in U.S. Pat. No. 4,254,101 to Denny, Jr., herein expressly incorporated by reference. The silicas used meet all of the requirements for dental-type silicas as described in the United States Pharmacopeia (USP) National Formulary. They have been filed for authorization by the Food & Drug Administration (FDA) for use in cosmetic and pharmaceutical products.

Edible toothpaste for dogs should avoid surfactants (cleaning and foaming agents) used in human toothpaste formulations, as they can cause digestive upsets in dogs if swallowed. As noted in the BSAVA *Manual of Small Animal Dentistry*, $2^{nd}$ Edition, British Small Animal Veterinary Association (1995):

> Dentifrices for use in the human mouth often contain up to 0.8% fluoride, either as sodium monofluorophosphate, sodium fluoride, or stannous fluoride. They also contain foaming agents. Such human toothpastes should not be swallowed, rendering them unsuitable for use in pets.

Additionally, in *The Practice of Veterinary Dentistry*, $2^{nd}$ Edition, by Ian Bellows, DVM (Iowa State University Press, Ames, Iowa 1999), it is stated that "Dentifrices (dental cleansers) are aids to cleaning and polishing tooth surfaces. Human toothpaste must not be used on dogs and cats because it contains detergents that should not be swallowed."

EXAMPLE

In a sample animal toothpaste formulary in accordance with the principles of the present invention, water is added in a quantity sufficient for processing. When applied to the rawhide chew, the toothpaste is thick and viscous, similar to a human toothpaste consistency. Sample ingredients are as follows (it is noted that, after the drying step, the noted percentages will be somewhat higher, due to removal of the water content):

| Ingredients | Percentage (By Weight) Before Drying |
|---|---|
| Dental grade silica abrasive (gives polishing abrasion and thickens toothpaste) | 10–12% |
| Dicalcium phosphate dihydrate (Dentifrice grade toothpaste polish and abrasive) | 2–4% |
| Pumice (a toothpaste polish and abrasive) | 1–2% |
| Toothpaste Thickening and Binding Agents: | |
| Sorbitol | 10–40% |
| Polyethylene glycol | 4% |
| Carboxymethylcellulose | 1% |

-continued

| Ingredients | Percentage (By Weight) Before Drying |
|---|---|
| Glycerin | 15% |
| Flavor | 1–3% |
| Water sufficient for processing | |
| Moisture level in product after drying | Under 10% |

The toothpaste formula, once mixed, is heated to a temperature (preferably about 170 degrees) which permits it to be sprayed onto the dried ear pieces. The pieces are preferably placed in a rotating mixing drum and the heated toothpaste formula is sprayed onto the tumbling pieces or chews. Following the coating (spraying) step, the product is placed on screens in racks and air dried.

Alternatively, the ear sections may be ground into smaller pieces of about 1/8 inches to 1/2 inches in diameter and dried. The edible toothpaste is applied to and dried on the surface of the dried ground pieces.

The resulting edible toothpaste containing product is then molded into the shape of a dog chew. The dog chew can be made by a variety of processes. A preferred approach is to mix the edible toothpaste and dried ear piece with meat meal, bone meal, a binder such as malotdextrin, and/or gelatin. Water is added in a quantity sufficient for processing. The formula is heated, mixed, and placed into molds. After molding into suitable shapes, the product is dried in an oven.

The present invention has at least the following advantages over the prior art:

1. The chew piece includes a coating of abrasive edible toothpaste, which is dried thereon, and this toothpaste is formulated specifically for dogs, so as not to contain foaming surfactants found in human toothpaste. When chewed, the dog's saliva rehydrates the dried toothpaste.
2. The abrasive edible toothpaste has a high level of anti-tartar toothpaste formula, such as the silica abrasives described in U.S. Pat. No. 4,254,101.
3. The chew base contains a tough cartilage portion with dried skin (rawhide) on each side. This three-thickness chew allows prolonged chewing time, effectively prolonging dental cleaning time when compared to single layer rawhide pieces used in the prior art.

Accordingly, although an exemplary embodiment of the invention has been shown and described, it is to be understood that all the terms used herein are descriptive rather than limiting, and that many changes, modifications, and substitutions may be made by one having ordinary skill in the art without departing from the spirit and scope of the invention.

What is claimed is:

1. A pet chew product comprising a chewable edible substance having a pet toothpaste formulation consisting essentially of dental grade silica abrasives disposed on an outer surface thereon, said pet toothpaste formulation excluding surfactants.

2. The pet chew product as recited in claim 1, wherein said chewable substance comprises rawhide.

3. The pet chew product as recited in claim 1, wherein said toothpaste is coated onto said outer surface.

4. The pet chew product as recited in claim 1, wherein said dental grade silica abrasives comprise at least about 10% by weight of said edible toothpaste coating.

5. The pet chew product as recited in claim 2, and further comprising meat meal.

6. The pet chew product as recited in claim 2, and further comprising bone meal.

7. The pet chew product as recited in claim 2, and further comprising a binder.

8. The pet chew product as recited in claim 1, wherein said toothpaste further comprises dicalcium phosphate dihydrate.

9. The pet chew product as recited in claim 8, wherein said toothpaste further comprises pumice.

10. The pet chew product as recited in claim 9, wherein said toothpaste further comprises one or more thickening and binding agents.

11. The pet chew product as recited in claim 11, wherein said thickening and binding agents comprise one or more agents selected from a group including sorbitol, polyethylene glycol, carboxymethylcellulose, and glycerin.

12. A method of making a pet chew product which is effective in reducing tartar on a pet's teeth, comprising:
   providing a piece of chewable material having an outer surface; and
   applying a pet toothpaste formulation consisting essentially of dental grade silica abrasives onto said outer surface, said pet toothpaste formulation excluding surfactants.

13. The method as recited in claim 12, and further comprising a step of heating said toothpaste formulation prior to said applying step.

14. The method as recited in claim 13, wherein said toothpaste formulation is heated to approximately 170 degrees F. during said heating step.

15. The method as recited in claim 13 wherein said applying step is performed by spraying said toothpaste formulation onto said outer surface.

16. The method as recited in claim 12, wherein said piece of chewable material comprises rawhide.

17. The method as recited in claim 16, wherein said piece of chewable material comprises an inner layer of cartilage about which opposing layers of said rawhide are disposed.

18. The method as recited in claim 12, wherein said providing step includes a step of grinding a plurality of pieces of said chewable material into sizes ranging from about 1/8 inches to 1/2 inches in diameter.

19. The method as recited in claim 18, wherein said providing step includes a further drying step.

20. The method as recited in claim 12, wherein said providing step includes a step of providing a plurality of pieces of chewable material, and said applying step comprises placing said plurality of said pieces of chewable material into a rotating mixing drum and spraying said toothpaste formulation onto said plurality of pieces of chewable material while they are tumbling in said drum.

21. The method as recited in claim 12, and comprising a further step of molding said piece of chewable material having said toothpaste formulation thereon into a predetermined shape.

22. The method as recited in claim 21, wherein said molding step includes a step of mixing said piece of chewable material having said toothpaste formulation thereon with additional material and a binder to form a pet chew mixture.

23. The method as recited in claim 22, wherein said additional material includes meat meal and/or bone meal.

24. The method as recited in claim 22, wherein said mixing step includes adding water to the pet chew mixture.

25. The method as recited in claim 24 and further comprising a step of heating the pet chew mixture.

26. The method as recited in claim 25, and further comprising a step of placing said heated mixture into molds, and then placing said molds into an oven to dry the heated mixture.

* * * * *